(12) United States Patent
  Cianco-Bunch et al.

(10) Patent No.: US 9,275,373 B2
(45) Date of Patent: Mar. 1, 2016

(54) E-MAIL CONTAINING LIVE CONTENT

(75) Inventors: James Michael Cianco-Bunch, Indianapolis, IN (US); Scott McCorkle, Fishers, IN (US); Richard W. Jamison, Indianapolis, IN (US)

(73) Assignee: EXACTTARGET, INC., Indianapolis, IN (US)

( * ) Notice: Subject to any disclaimer, the term of this patent is extended or adjusted under 35 U.S.C. 154(b) by 583 days.

(21) Appl. No.: 12/919,982

(22) PCT Filed: Mar. 2, 2009

(86) PCT No.: PCT/US2009/001320
§ 371 (c)(1),
(2), (4) Date: Nov. 29, 2010

(87) PCT Pub. No.: WO2009/108387
PCT Pub. Date: Sep. 3, 2009

(65) Prior Publication Data
US 2011/0066692 A1    Mar. 17, 2011

Related U.S. Application Data

(60) Provisional application No. 61/032,817, filed on Feb. 29, 2008.

(51) Int. Cl.
*G06F 15/16*       (2006.01)
*G06Q 10/10*       (2012.01)
*G06Q 30/02*       (2012.01)

(52) U.S. Cl.
CPC .............. *G06Q 10/107* (2013.01); *G06Q 30/02* (2013.01)

(58) Field of Classification Search
USPC ......................................................... 709/206
See application file for complete search history.

(56) References Cited

U.S. PATENT DOCUMENTS

| | | | |
|---|---|---|---|
| 6,101,486 A | | 8/2000 | Roberts et al. |
| 2002/0032602 A1* | | 3/2002 | Lanzillo et al. ................. 705/14 |
| 2004/0215479 A1 | | 10/2004 | Dorsey et al. |
| 2005/0038861 A1 | | 2/2005 | Lynn et al. |
| 2005/0144246 A1* | | 6/2005 | Malik ........................... 709/206 |
| 2006/0095514 A1 | | 5/2006 | Wang et al. |
| 2008/0195476 A1* | | 8/2008 | Marchese et al. ............... 705/14 |
| 2008/0243623 A1* | | 10/2008 | Redford et al. ................. 705/14 |
| 2011/0231237 A1* | | 9/2011 | Christensen ............... 705/14.26 |

OTHER PUBLICATIONS

International Searching Authority, International Search Report, PCT/US09/001320, dated Apr. 30, 2009.
International Searching Authority(ISA), Written Opinion of the ISA, PCT/US09/001320, dated Apr. 30, 2009.

* cited by examiner

*Primary Examiner* — Esther B Henderson
(74) *Attorney, Agent, or Firm* — Morris & Kamlay LLP

(57) ABSTRACT

A system for introducing live content into an electronic mail message comprising at least one dynamic live content area sent through an e-mail service provider system comprises memory and a click manager. The memory includes live content comprising image data and expiration data. The click manager receives an indication of the opening of the message by a recipient, wherein the click manager accesses the memory to retrieve live content and send the retrieved live content for rendering in the dynamic live content area of the e-mail message opened by the one of the plurality of recipients.

24 Claims, 14 Drawing Sheets

E-MAIL CONTAINING LIVE CONTENT

PRIORITY

The present application is related to, and claims the priority benefit of, International Patent Application Serial No. PCT/US2009/001320, filed Mar. 2, 2009, which is related to, and claims the priority benefit of, U.S. Provisional Patent Application Ser. No. 61/032,817, filed Feb. 29, 2008. The contents of each of these applications are hereby incorporated by reference in their entirety into this disclosure.

BACKGROUND

The disclosed system and method relate to dynamic electronic mail (e-mail) content and more particularly to providing e-mails that have their final content determined or rendered after the sending of the e-mail or at the time of opening of the e-mail so that the content displayed therein is timely.

The disclosed systems, methods and graphical user interfaces disclosed herein may be envisioned as extending the functionality of the Dynamic Content Electronic Mail Marketing System and Method, disclosed in pending U.S. application Ser. No. 10/769,095, (published as U.S. Pub. No. 2004/0,215,479 A1). Additionally, the disclosed systems and methods may be implemented in other systems and methods of providing dynamic content e-mail messages with live content.

Since the advent of e-mails and more particularly since the popularity of utilizing e-mails transferred over the interne has increased, advertisers and others have utilized the e-mail media to convey messages and advertising to potential customers. One problem with utilizing e-mail for conveying time sensitive information, such as, for example, notifying a potential customer of a one day sale, advertising a limited inventory item or similar time sensitive matter, is that there is no assurance that the e-mail will be opened by a time such that the information is not irrelevant. For example, an e-mail advertising a price on a limited inventory item which is opened after the entire inventory of the item is sold will not be timely.

E-mail marketers commonly know more than just the content of their messages; frequently they know a considerable amount about demographics and other information regarding recipients of their messages. This demographic and other information may be utilized to prepare targeted e-mail messages for sending only to recipients believed to have an interest in the content contained therein. One key in e-mail marketing success is that the advertisements or other marketing materials that are delivered fit with the expectations or interests of the recipient. Especially when a recipient is a subscriber to a newsletter or to an e-mail marketer's program or system, e-mail marketers seek to avoid abusing the permission granted by or failing to honor the privacy of the subscriber, and providing the subscriber with irrelevant content.

One problem with e-mail advertisement is determining an appropriate pricing scheme for advertisements to be placed in e-mails. Advertisers who place advertisements on web pages are accustomed to pricing schemes which result in them being charged only when there is a possibility that the advertisement has been seen, such as when a user views a web page upon which the advertisement is placed, or when a user has taken some action indicative of a possible interest in the advertisement, such as clicking on a hyperlink in the advertisement displayed on the web page they are viewing. Thus, one common pricing scheme utilized to sell advertising space (inventory) on web pages is based on cost per thousand impressions of the advertising being sold ("CPM"). Typically, each view of a web page upon which the advertisement is displayed is considered an impression in such a pricing scheme. Another common pricing scheme for electronic advertising is to charge based on the number of interactions with an advertisement, such as charging for each click on a hyperlink associated with the advertisement, which is know as cost per click ("CPC") pricing. In other words an advertiser purchasing advertising space on a web page may pay a given amount for 1000 web page views with their ad present on that page and even higher rates for cost per click CPC or 1000 clicks on their ad. Those skilled in the art will recognize that advertising pricing schemes may be based on more or fewer impressions than the above disclosed one thousand impressions or on more than each single click.

Marketers using e-mail service providers ("ESPs") are already placing ads in their e-mails today. Entertainment venues, online hotel inventory sellers, travel websites and many other companies whose core business is not advertising are selling ad space in e-mail messages sent to their consumers. Many customers and marketers would appreciate an improved way to monetize their e-mail program. E-mail is trackable and well known methods exist for determining when an e-mail message is delivered, when the e-mail message is opened and/or when some content within the e-mail message is interacted with by a recipient.

Traditionally, ESPs have fixed at the time of sending of e-mails the location of all images to be retrieved in targeted e-mails when they are opened. Thus, what the recipient will see when they open the e-mail message is determined at the time it is sent, not at the time it is opened. Utilizing this traditional method of creating targeted e-mails, if an e-mail message is opened multiple times the same advertising would be displayed each time it is opened, even if it is opened after some time limit for taking advantage of the advertising has expired. As mentioned above, advertising on web pages is sold via models where targeting techniques are used on every web page view or impression, to ensure that the most targeted and relevant ad is presented to the end user when viewing the web page. Also, the ads are traditionally sold based on cost per thousand ("CPM") to drive the ad dollar spent by the advertiser. Currently, if an advertiser wants to place ads in an e-mail, they have difficulty selling advertising based on CPM impressions because a single e-mail may be opened multiple times.

Advertisers and others sending e-mails to recipients would appreciate a system and method wherein e-mail opens are treated like web page impressions, allowing the e-mail to retrieve the most targeted and relevant advertisement for the recipient. Images contained in the e-mail message can be rendered at the time of open, allowing an ad-server, which may be an in-house ad server of the targeted e-mail server or a third party ad server, to treat e-mail inventory with the same logic that drives online advertising.

Advertisers and others sending e-mails to recipients would appreciate the ability to send e-mail messages that, no matter when the e-mail messages are opened, contain timely content.

SUMMARY

The disclosed e-mail live content (which may include without limitation advertisements and coupons.) behaves similar to content on a website. In other words the content can rotate at the time of opening of an e-mail message, much like the content on website rotates with each impression. This would allow a business to sell ads in e-mail in the standard "cost per thousand" impressions ("CPM") or "cost per click" ("CPC") models or pricing schemes utilized for selling advertisement presented by web pages.

According to one aspect of the disclosure, a system for introducing live content into an electronic mail message comprising at least one dynamic live content area sent through an e-mail service provider system comprises memory and a click manager. The memory includes live content comprising image data and expiration data. The click manager receives an indication of the opening of the message by a recipient, wherein the click manager accesses the memory to retrieve live content and send the retrieved live content for rendering in the dynamic live content area of the e-mail message opened by the one of the plurality of recipients.

According to another aspect of the disclosure, a system for generating electronic mail containing live dynamic content comprises a first remote device, memory, and an e-mail provider system. The first remote device creates an e-mail message comprising at least one dynamic live content area. The memory includes live content comprising image data and expiration data. The e-mail provider system is communicatively coupled to the first remote device and to the memory. The e-mail provider system is programmed and configured to: identify a plurality of recipients, each of the plurality of recipients having at least one attribute associated therewith; send the e-mail message to the plurality of recipients; associate at least one of the at least one attribute with the dynamic live content area; determine that a sent e-mail has been opened by one of the plurality of recipients; and, upon determining that an e-mail message has been opened by one of the plurality of recipients, access the memory to retrieve live content and send the retrieved live content for rendering in the dynamic live content area of the e-mail message opened by the one of the plurality of recipients.

According to yet another aspect of the disclosure, a method for sending to a recipient an electronic mail message presenting live content comprises: providing a system for enabling the creation of and for sending the electronic message, the system comprising an outbound e-mail manager, and a click manager; receiving a call for the live content from the electronic mail message at the click manager when the electronic message is opened by the recipient; and delivering to the electronic mail message the live content.

Additional features and advantages of the invention will become apparent to those skilled in the art upon consideration of, the following detailed description of a preferred embodiment exemplifying the best mode of carrying out the invention as presently perceived.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
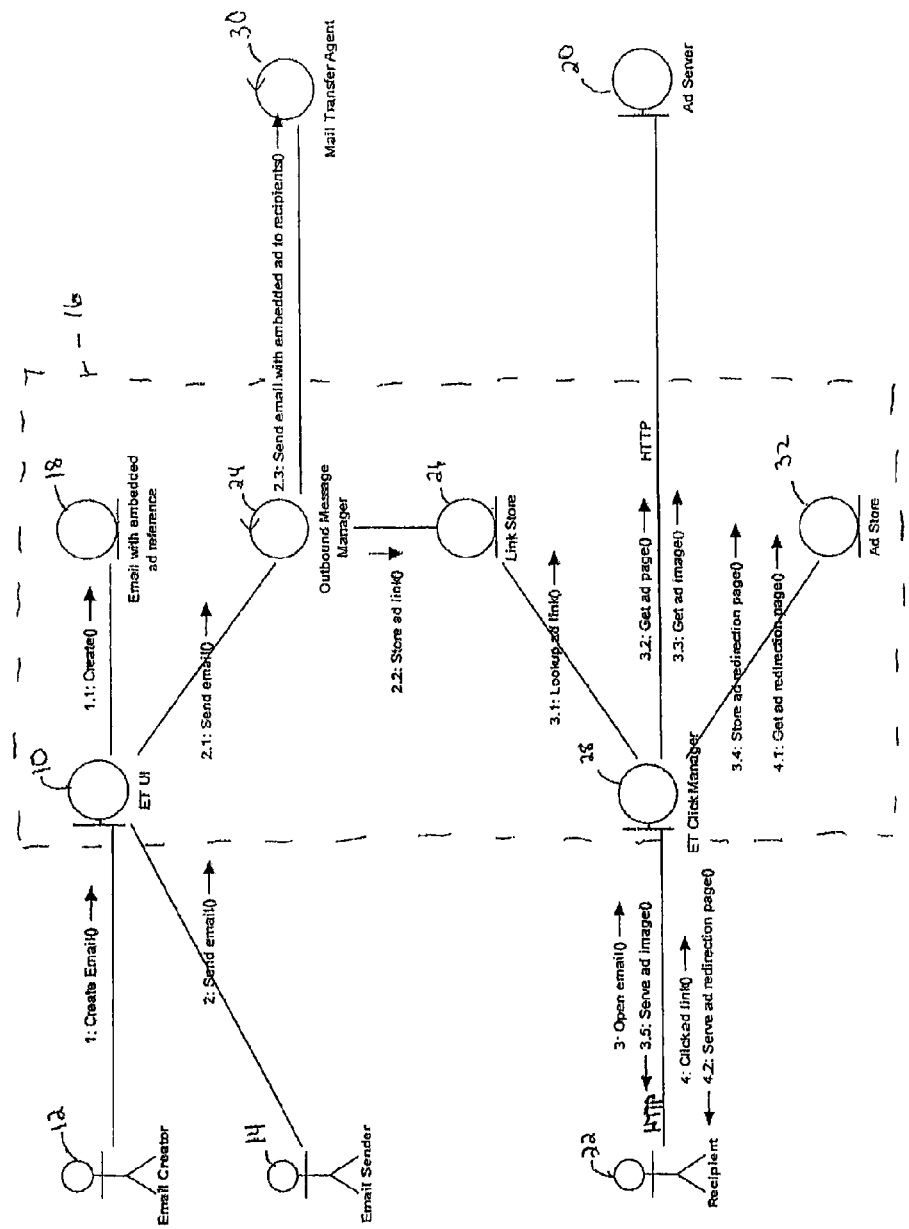
FIG. 1 is a UML diagram of one embodiment of a system and method of providing an e-mail containing live content.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

As shown, for example, in FIG. 1, one embodiment of the disclosed system and method includes a targeted e-mail service provider user interface ("ET UI") 10 through which an e-mail creator 12 and/or an e-mail sender 14 interact with an e-mail service provider ("ESP") system 16 to create an e-mail document with embedded live content (e.g. an embedded ad reference) 18. While the description herein will often refer to ads, advertisements or coupons, as the live content to which this disclosure relates, it is within the scope of the disclosure for the live content to be other materials. Such other materials may include, for example, other time sensitive materials that should be viewed before: a certain number of views; a deadline; depletion of a certain amount of inventory; or an expiration time. The process of creating the e-mail document with embedded live content 18 will be described in greater detail hereafter.

The step of creating the e-mail may include creating an e-mail document with at least one dynamic content area such as described in U.S. application Ser. No. 10/769,095, (U.S. Publication No. U.S. Pub. No. 2004/0,215,479 A1) which dynamic content area is configured for receiving live content.

Figure 9:
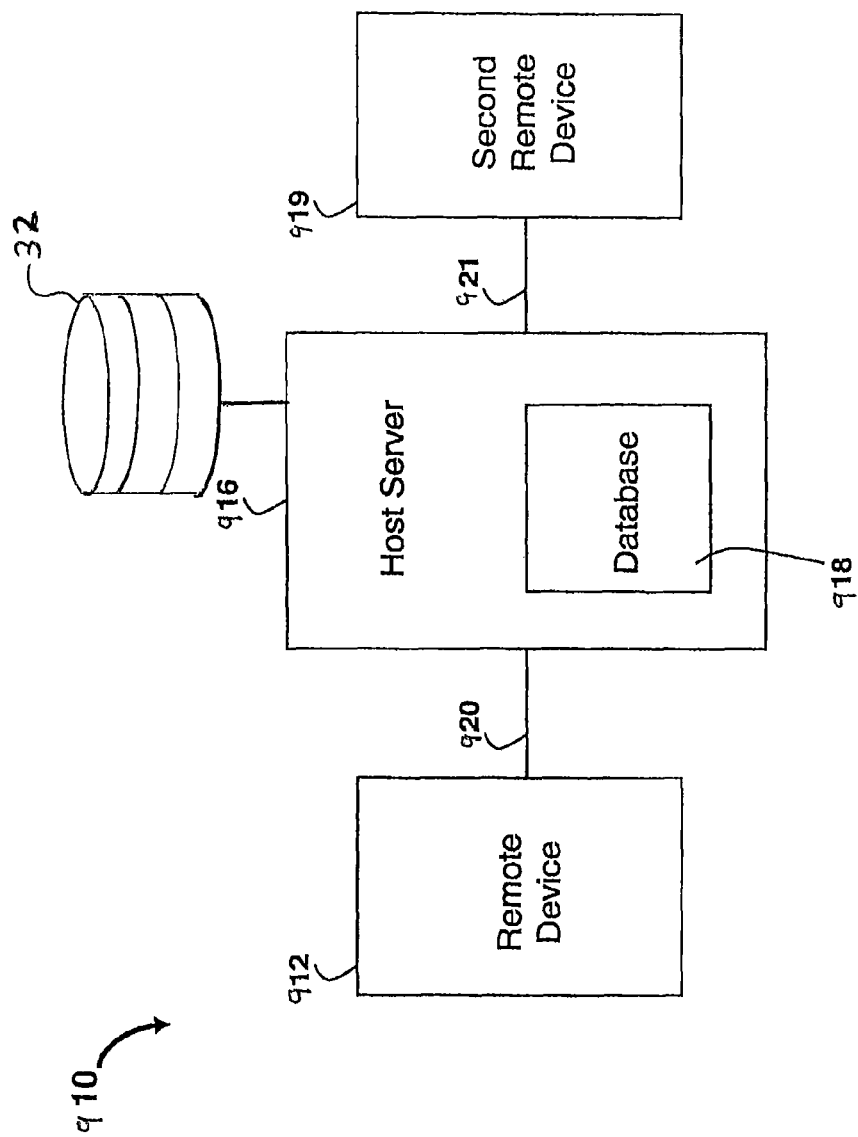
FIG. 9 shows a block diagram of the components of one embodiment of the disclosed system.

Referring now to FIG. 9, there is shown one embodiment of the components of the dynamic content e-mail marketing system that may be utilized to generate an e-mail document containing dynamic live content. System 910 comprises first remote device 912, ESP system, sometimes referred to as host server, 916, database 918, second remote device 919, and computer networks 920 and 921 and advertisement storage or ad store 32. For purposes of clarity, only one first remote device 912 and second remote device 919 and ad store 32 are shown in FIG. 9. However, it is within the scope of the present disclosure, and it will be appreciated by those of ordinary skill in the art, that the system 910 may have two or more first remote devices 912, second remote devices 919, and/or ad stores 32 operating at the same time. In the embodiment shown in FIG. 9, first remote device 912 is operated by an e-mail sender and second remote device 919 is operated by an e-mail recipient. However, it is within the scope of the present disclosure, and will be appreciated by one of ordinary skill in the art, that system 910 may simply comprise a single remote device used by both the e-mail sender and the e-mail recipient.

In the embodiment illustrated in FIG. 9, ad store 32 is shown as being separate from, but accessible, by the host server 916. However, it is within the scope of the disclosure for ad store 32 to be implemented in the database 18 or elsewhere in memory on the host server 916. Additionally, ad store 32 may be implemented in multiple memory devices located at multiple sites, some of which are local on host server 916 and some of which are remote from host server 916. In one embodiment, advertising media stored in ad store 32 is associated with currency data indicative of the currency of the advertising media, similar to a "sell by" or "freshness date." In one embodiment of the disclosed system and method, the currency data is utilized in determining which advertisement to render in the live content area 1006 of an e-mail message that is being opened. Alternatively, advertising media may be deleted from or moved to an inactive area of the database when it is no longer relevant.

In one embodiment of the disclosed system, first remote device 912 and second remote device 919 are computers, computing devices, or systems of a type well known in the art, such as a mainframe computer, workstation, personal computer, laptop computer, hand-held computer, cellular telephone, or personal digital assistant. First remote device 912 and second remote device 919 comprise such software, hardware, and componentry as would occur to one of skill in the art, such as, for example, one or more microprocessors, memory systems, input/output devices, device controllers, and the like. First remote device 912 and second remote device 919 also comprise one or more data entry means (not shown in FIG. 9) operable by users of first remote device 912 and second remote device 919 for data entry, such as, for example, a pointing device (such as a mouse), keyboard, touchscreen, microphone, voice recognition, and/or other data entry means known in the art. First remote device 912 and second remote device 919 also comprise a display means (not shown in FIG. 9) which may comprise many of the well known display means such as cathode ray tube displays, liquid crystal diode displays, light emitting diode displays, etc., upon which information may be displayed in a manner perceptible to the user.

Resident on, or accessible by, second remote device 919 operated by the e-mail recipient is a software means known in the art for retrieving e-mail messages from an e-mail mailbox including, but not limited to software means for viewing e-mail messages, for composing a response to an e-mail message, and for deleting an e-mail message.

Host server 916 comprises one or more server computers, computing devices, or systems of a type known in the art. Host server 916 further comprises such software, hardware, and componentry as would occur to one of skill in the art, such as, for example, microprocessors, memory systems, input/output devices, device controllers, display systems, and the like. Host server 916 may comprise one of many well known servers, such as, for example, IBM®'s AS/400® Server, IBM®'s AIX UNIX® Server, or MICROSOFT®'s WINDOWS NT® Server. In FIG. 9, host server 916 is shown and referred to herein as a single server. However, host server 916 may comprise a plurality of servers or other computing devices or systems interconnected by hardware and software systems know in the art which collectively are operable to perform the functions allocated to host server 916 in accordance with the present disclosure.

Database 918 is "associated with" host server 916. According to the present disclosure, database 918 is "associated with" host server 916 where, as shown in the embodiment in FIG. 1, database 918 resides on host server 916. Database 918 is also "associated with" host server 916 where database 918 resides on a server or computing device remote from host server 916, provided that the remote server or computing device is capable of bi-directional data transfer with host server 916. Preferably, the remote server or computing device upon which database 918 resides is electronically connected to host server 916 such that the remote server or computing device is capable of continuous bi-directional data transfer with host server 916.

For purposes of clarity, database 918 is shown in FIG. 9, and referred to herein as a single database. It will be appreciated by those of ordinary skill in the art that database 918 may comprise a plurality of databases connected by software systems of a type well known in the art, which collectively are operable to perform the functions delegated to database 918 according to the present disclosure. Database 918 may comprise a relational database architecture or other database architecture of a type known in the database art. Database 918 may comprise one of many well known database management systems, such as, for example, MICROSOFT®'s SQL® Server, MICROSOFT®'s ACCESS®, or IBM®'s DB2® database management systems, or the database management systems available from ORACLE® or SYBASE®. Database 918 retrievably stores information that is communicated to database 918 from first remote device 912 through computer network 920. In one embodiment, database 918 may also retrievably store information that is communicated to database 918 from second remote device 919 through computer network 921. In one embodiment, database 918 may also retrievably store information that is communicated to database 918 from ad store 32.

First remote device 912 communicates with host server 916 via computer network 920 and second remote device 919 communicates with host server 916 via computer network 921. For purposes of clarity, computer network 920 and computer network 921 are shown in FIG. 9 as distinct computer networks. However, computer networks 920 and 921 may comprise the same computer network. The communication between first remote device 912 and second remote device 919 and host server 916 may be bi-directional. Computer networks 920 and 921, or both, may comprise the Internet, but this is not required. Other networks, such as Ethernet networks, cable-based networks, and satellite communications networks, well known in the art, and/or any combination of networks are contemplated to be within the scope of the disclosure.

The e-mail creator 12 may access the ESP system 16 via a first remote device 912 coupled via a network 920 to the ESP system 16 as described in U.S. application Ser. No. 10/769,095. The remote device may be a computing device such as a P.C., laptop, personal digital assistant or other device having a network interface which may be running browser software or is otherwise capable of interfacing with the ET UI 10.

While only a single e-mail creator 12, e-mail sender 14 and e-mail document with an embedded live content ad reference 18 are shown, the disclosure envisions that a plurality of e-mail creators 12, e-mail senders 14 and e-mail documents with an embedded live content reference 18 may be accommodated by the disclosed system and method.

In one specific embodiment of the disclosed system and method, the created e-mail document 18 is to be used in carrying out an advertising campaign utilizing e-mail messages delivered to recipients identified by an advertiser. The recipients 22 (shown as a single recipient, but envisioned to include a plurality of recipients) may be persons who have provided their e-mail addresses and possibly other demographic information to the advertiser with the knowledge that they may receive e-mails sent on behalf of the advertiser, i.e. they may have "opted in" to receiving e-mails from the advertiser. The advertiser utilizing a first remote device 912 may upload a list of recipients as well as demographic information regarding each recipient that includes at least one attribute utilized to select the appropriate dynamic content and/or the appropriate live content to be included in the e-mail message opened by the recipient.

Figure 10:
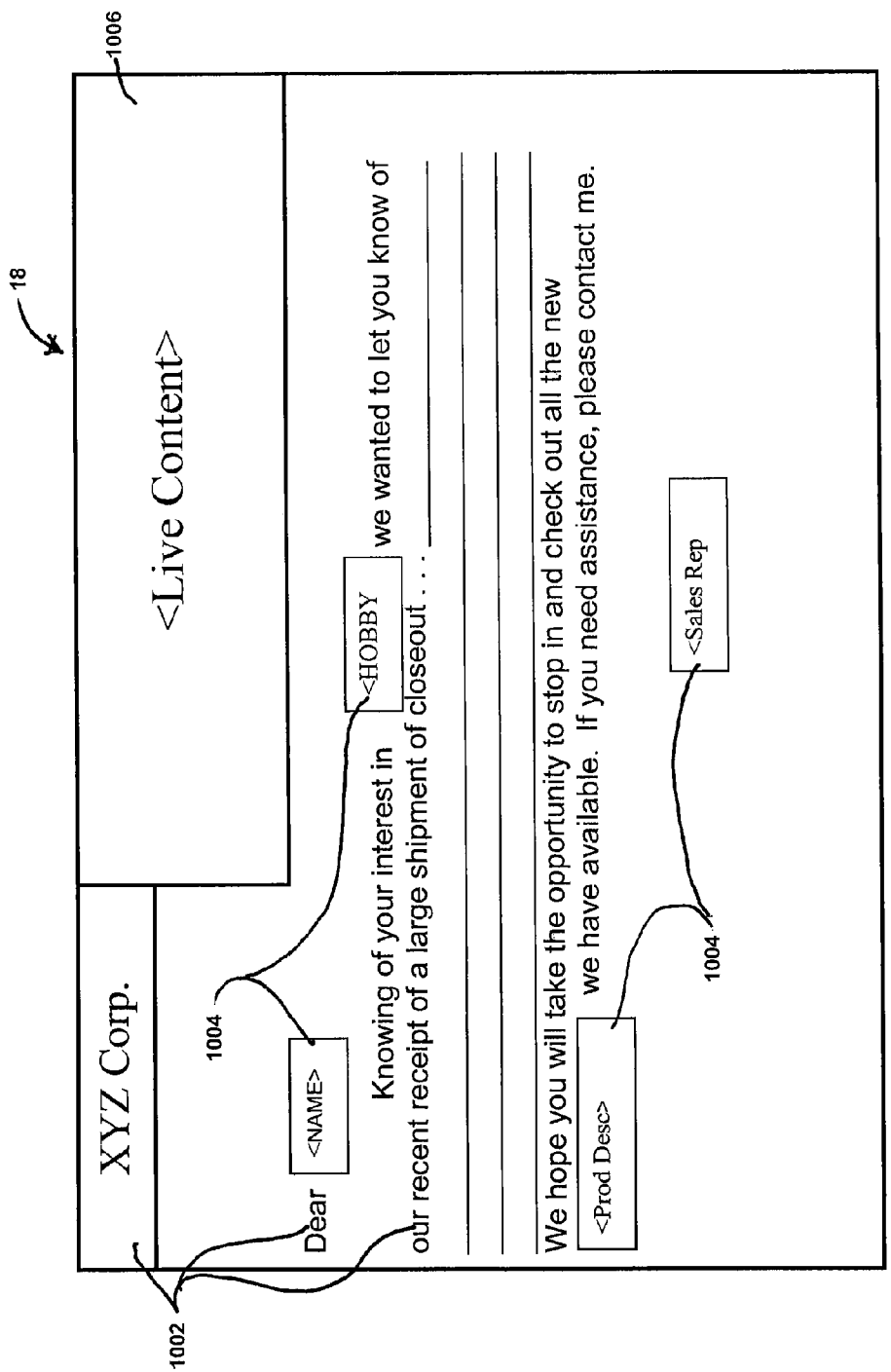
FIG. 10 shows an e-mail message document with live content that includes generic content, multiple dynamic content areas and a live content area.

As shown, for example, in FIG. 10, the created e-mail document with live content 18 may include areas that include generic content 1002, such as the name of the advertiser or person on whose behalf it is sent and other generic text or images, and one or more dynamic content areas 1004, 1006 that will include dynamic content selected based on some appropriate criteria or attribute associated with the recipient, which may include demographic information regarding the recipient. At least one dynamic content area 1006 in the e-mail document 18 is configured to display live content and is thus referred to as live dynamic content area or live content area 1006. In one embodiment of the disclosed system and method, the selection of appropriate content to populate the dynamic content area 1004 is accomplished as described in U.S. Pub. No. 2004/0,215,479 and the selected dynamic content is rendered at the time the e-mail is sent. The selection of the one or more items of appropriate live content for rendering in the live dynamic content area 1006 of the e-mail message at the time it is opened may also be based on demographic information of the recipient. The live content may be selected from one or more dynamic content items uploaded for storage in an ad server 20.

In the embodiment illustrated in FIG. 1, the ad server 20 is a third party ad server such as, for example, 24/7 Real Media®, and DoubleClick®'s Dart for Publishers®. Other third party ad servers may be utilized within the scope of the disclosure. It is also within the scope of the disclosure for the ad server 20 to be a server implemented by the ESP system 16. The ad server 20 may include memory or other storage media such as ad store 32 for storing the live content. Ad servers 20 may include other server-side logic for real time rendering.

Figure 11:
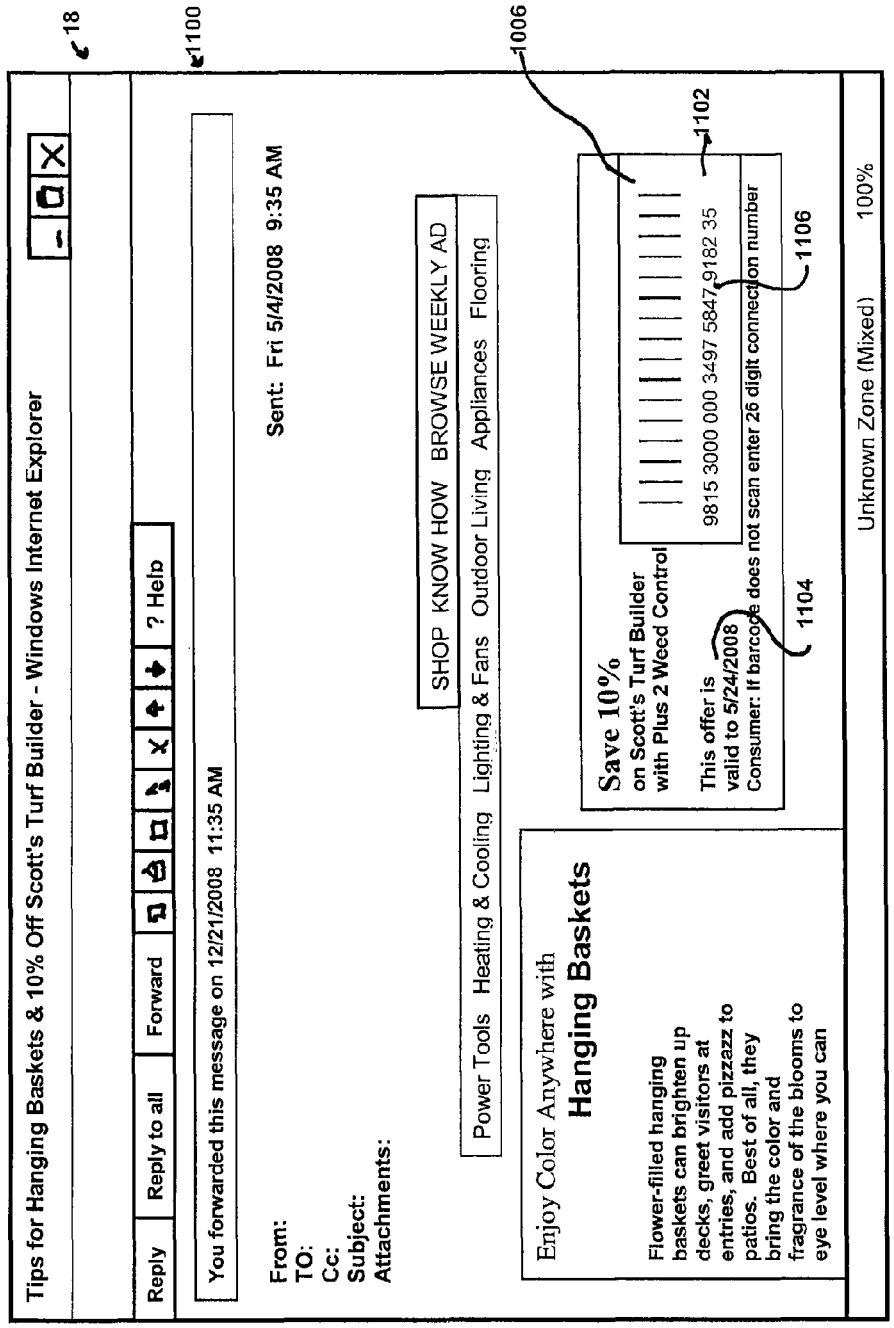
FIG. 11 is a screen shot of an e-mail document with live content showing a coupon rendered at the time of opening as the live content.
Figure 12:
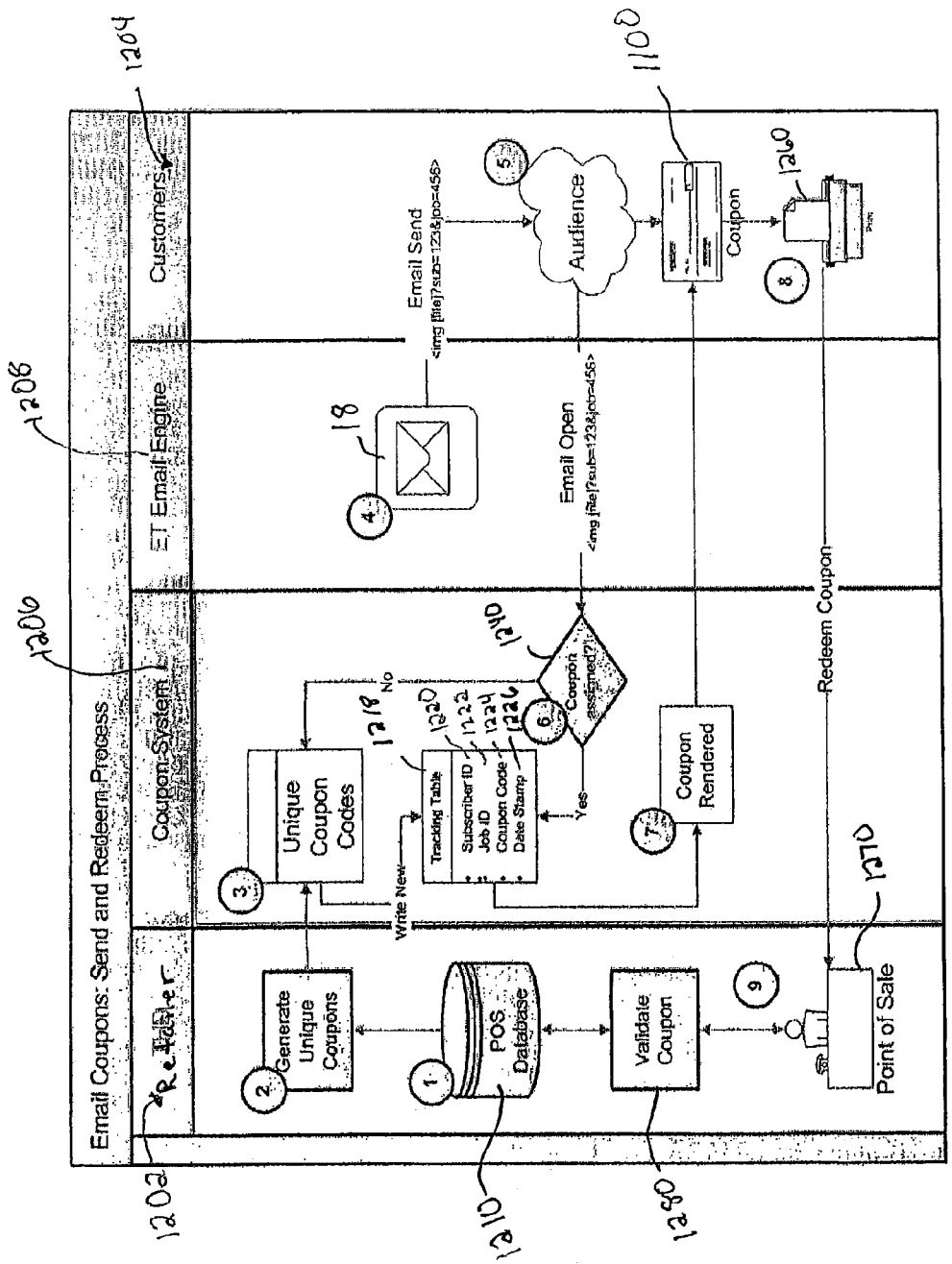
FIG. 12 is a diagram of an embodiment of the disclosed system and method wherein the live content delivered is a coupon.
Figure 13:
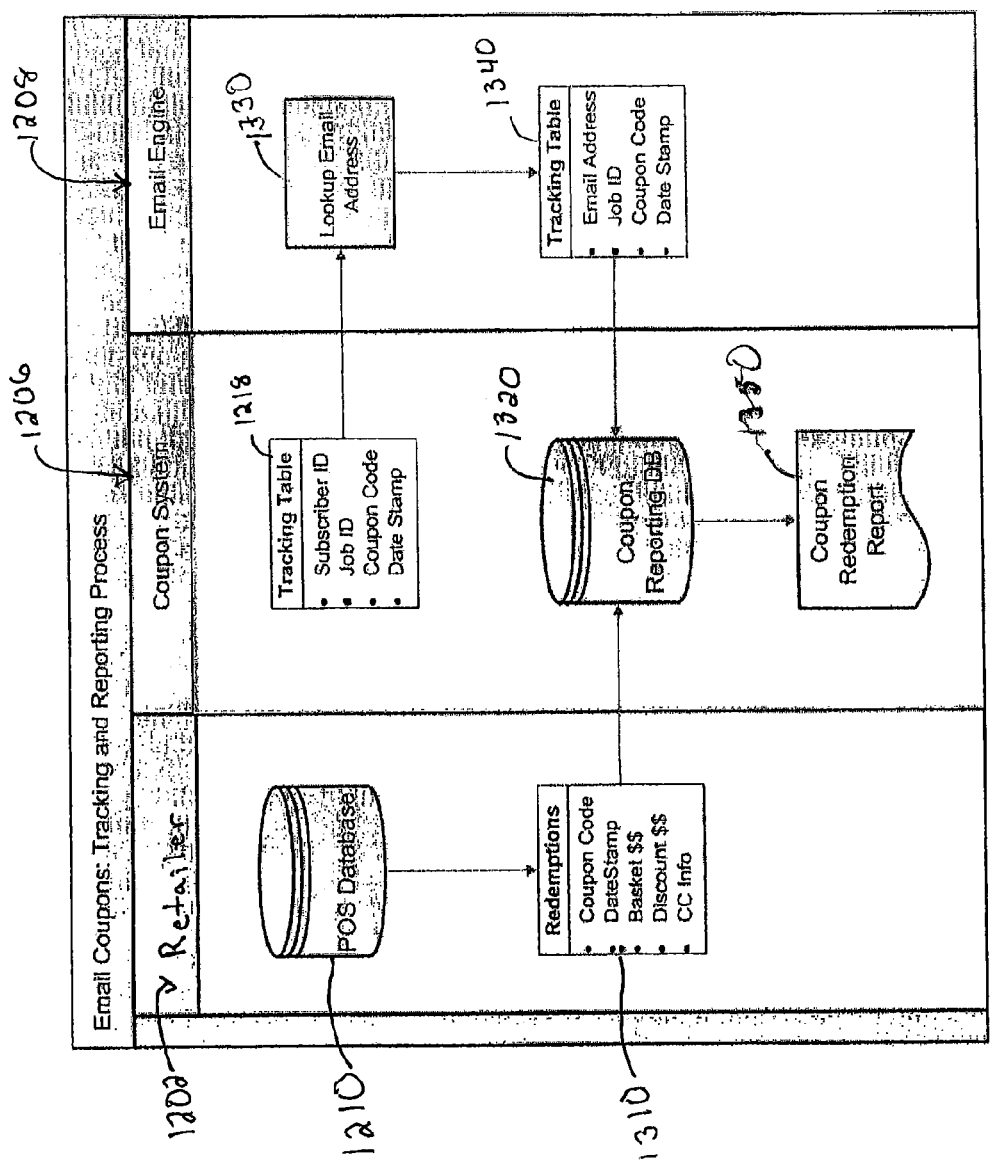
FIG. 13 is a diagram of a tracking and reporting process implemented by the disclosed system and method.

In one embodiment of the disclosed system, method and user interface, as shown, for example, in FIGS. 11-13, the live content displayed in the live content area 1006 of the e-mail document with embedded live content 18 is a coupon 1102 with an expiration date 1104. In FIG. 11, the illustrated e-mail with embedded live content 18 has been opened and is thus an opened e-mail 1100. This embodiment, allows cross channel tracking of the coupons issued and utilized. This embodiment may be utilized in different scenarios, such as, for example, allowing in store discounts, offering callback incentives for in store purchases of abandoned online items, or for geo-targeted "competitive couponing."

It has been recognized that proximity to a shopping location influences shopping preference with consumers exhibiting a location-based loyalty to similar market retailers, such as, for example, large chain retailers who sell home improvement items. "Competetive couponing" refers to the process whereby a retailer not in the home market of a consumer attempts to draw the consumer away from a similar market retailer in the consumer's home market by offering coupons to the consumer in the hopes that the offered savings will induce the consumer to purchase an item from the retailer's store rather than from a similar market retailer in the consumer's home market. The market retailer will generally forego sending similar coupon offers to the consumers in their own market territory who would likely patronize the retailer's store based on proximity alone, thereby reducing wasteful spending on coupons. The market retailer will also generally forego sending similar coupon offers to the consumers who are too distant from their own market territory, thereby further reducing wasteful spending on coupons. Thus, competitive couponing is considered to be geo-targeted advertising.

The image of the coupon 1102 may be stored in memory along with expiration data, such as, for example, a time stamp, that indicates the latest moment that the advertiser desires the coupon to be presented to a recipient, which is typically a date earlier than the expiration date 1104 printed on the coupon. Expiration data may alternatively, or additionally, include an initial fixed number or remaining number of coupons to be delivered which number may be decremented each time an image of the coupon 1102 is rendered. Expiration data may include data regarding the remaining number of an item available in a limited quantity, such as tickets to a sporting or entertainment event, seats on public transportation, etc. which number may be decremented each time an item of limited quantity is acquired. The expiration data is associated with the live content image in memory by providing appropriate links or pointers or by storing the image and expiration data in fields of a database. The image and expiration data may be stored in an appropriate data structure, such as a stack, a queue, a tree etc. along with other live content. Although this disclosure describes an "image" it should be understood that such term includes concepts such as text and other features that are to be presented as live content.

Desired attributes for recipients of the coupon to exhibit may also be stored in memory and associated with the image and the expiration data for each live content item. Separate data structures identified by the desired attribute which a recipient should exhibit to be presented with the live content may be created so that when each recipient's attribute is determined, the link or code in the live content area 1006 may direct that the appropriate data structure be accessed to retrieve appropriate live content for rendering in an opened e-mail 1100.

As shown, for example, in FIG. 12, a retailer 1202 wishing to offer to consumers 1204 coupons 1006 rendered in an open e-mail 1100 generates unique coupon codes for consumption by a point of sale system which unique codes would be Stored in a Point of Sale (POS) database 1210. Separate distinct coupon codes may be generated for each coupon in multiple offers or coupon campaigns. For instance, one coupon campaign may offer 40% discount on a particular item while a different coupon campaign may offer two for one pricing on a different item. Images are generated for each coupon to be presented for each distinct coupon campaign the coupon image will indicate the terms of the offer, any expiration date 1104 for accepting the offer and other information such as a bar code or other indicia indicative of the unique coupon code 1106. The image for each coupon is stored in a database, such as, for example, ad store 32 (FIG. 1) or the coupon system 1206, associated with the e-mail campaign or JobID 1222, coupon code 1224 and expiration data indicative of the last date on which the coupon should be rendered in an opened e-mail 1110. The coupon image may also be stored with information indicative of the types of demographic data, including geographic location data, any recipient of the coupon should exhibit. The information associated with each coupon image facilitates tracking multiple offers for reporting and billing purposes.

In one embodiment of the system and method, when a coupon has been rendered at the time of the first opening of the e-mail 1100, the same coupon is rendered (including the unique coupon number indicia) each time that e-mail is opened. If the e-mail is reopened after the expiration date of the coupon, an image may be stored in the database associated with the coupon that causes the e-mail engine to render an "Invalid Coupon" image on top of the coupon image or and "Offer No Longer Valid" image in place of the coupon image. These "Invalid Offer" and or "Offer No Longer Valid" images may be generic images or may be specific to each coupon campaign within the scope of the disclosure. These "Invalid Offer" and or "Offer No Longer Valid" images may contain any appropriate message or indicia that would convey the message that the coupon is no longer valid. Alternatively, instead of an indication that the offer is no longer valid, a standard message or coupon (for example 5% off any purchase) or different live content representing a current offer could be presented to the recipient.

E-mail messages with embedded live content 18 are generated by the e-mail engine 1208 of an ESP 16. As explained herein the e-mail message with embedded live content 18 may include generic information 1002, dynamic content that is rendered at the time of sending of the e-mail 1004 based on certain parameters related to the intended recipient of the e-mail as described in U.S. Pub. No. 2004/0,215,479, and a dynamic live content area 1006 in which live content (in this specific example an image of a coupon 1102 and indicia of the unique coupon code 1106) will be rendered at the time of the e-mail open. At the time of sending the e-mail with embedded live content 18, code within, or associated with the, live content area 1006 is included which is returned to the ESP 16 at the time the recipient or audience indicates a desire to open the e-mail document. In one specific embodiment this code is a parameterized image IMG call inserted in the e-mail with embedded live content by the ESP which identifies the individual and the appropriate coupon campaign to be rendered. One specific example of such an image call is: Pass Subscriber ID (/sub=123456) and jobID (&job-12345). In addition to the preceding code, internet visible values (e.g. in URL parameters) may be encoded in the parameterized image call as a security measure to limit the ability of a recipient to change values and thus iterate through the available coupon codes. This code contains indicia sufficient for the ESP to select appropriate live content to be rendered at the time the e-mail is opened.

When the e-mail with embedded live content 18 is opened the parameterized image call sends an IMG call to the coupon system 1206 so that a coupon assignment may be made at the time the image of the coupon is rendered. In one example, there are fewer codes created than there are subscribers on the list of recipients of the e-mail with embedded live content 18. The number of unique coupon identifiers may be based on historical data related to past open rates for similar campaigns and the number of recipients on the list. In the event that the coupon codes are all assigned (i.e. more recipients open the e-mail than historical data would predict), the "Offer No Longer Valid" image may be rendered in lieu of the image of the coupon.

Once a unique coupon code is assigned to a specific e-mail document at the time it is opened, the coupon system 1206 is programmed to not assign that specific code to any other opened e-mail. However if the same e-mail is opened more than once, the same coupon image with the unique code indicia as was previously rendered in that specific e-mail document is again rendered for the e-mail, at least so long as the offer remains valid. Thus, when an image call is sent to the coupon system 1206 an initial determination step 1240 is performed wherein it is determined whether a unique coupon code has been assigned to the specific e-mail document being opened. Upon receipt of an image call, the coupon system 1206 is programmed to look up the unique coupon identifiers (subscriber and campaign) contained in the image call. If the coupon has already been assigned to the subscriber for the specific campaign, the same coupon image is again rendered in the live content area of the opened e-mail as was previously rendered, at least so long as the offer remains valid. If the coupon has not already been assigned, the coupon system 1206 is configured to write a new record in a tracking table 1218 and render a new coupon in the opened e-mail with embedded live content 18 from which the IMG call was received. In one example, each record in the tracking table 1218 includes a subscriber ID 1220, a JobID 1222, a coupon code 1224 and a date stamp 1226. If the offer has expired or all of the unique coupon codes have already been rendered, the alternate "Offer is No Longer Valid" image may be rendered in the live content area.

At some time, either prior to going to the point of sale or while at the point of sale the e-mail with the rendered image of the coupon containing the unique coupon code is printed in a printing step 1260 by the recipient in order to redeem the offer contained therein. While described as being printed, it is within the scope of the disclosure for the recipient to either present the printed coupon from step 1260 or present the coupon code at the point of the sale or otherwise display the e-mail containing the rendered image of the coupon in a presentation step 1270, so that personnel or equipment at the point of sale may validate the coupon in a validation step 1280. In one embodiment, validation of the coupon step 1280 includes determining whether the unique coupon code is valid and determining that the unique coupon code has not been previously redeemed. The validation step 1280 may also involve recording usage information regarding the coupon usage by storing data in the POS database indicative of one or more of the coupon code, a datestamp indicating the time of redemption, a basket amount showing the total amount paid for all purchases during the redemption of the coupon, a discount amount, CC information, and basket information such as the SKUs for all items purchased during the coupon redemption, the departments from which items were purchased and/or other information regarding purchases made during coupon redemption.

As shown, for example, in FIG. 13, the tracking and reporting process associated with presenting e-mails with embedded live content 18 wherein the live content is a coupon 1102 includes several steps. As previously mentioned, at the time of redemption of the coupon, as a portion of the validation step 1280, redemption information is stored in the point of sale database 1210 associated with each unique coupon code. In the example shown in FIG. 13, this redemption information 1310 for each coupon code may include the coupon code, the datestamp of the time of the redemption, the basket amount, the discount amount and CC information. The retailer provides the redemption information 1310 to the coupon system 1206. It is within the scope of the disclosure that not all of the redemption information collected during the validation step 1280 for storage in the point of sale database 1210 is reported to the coupon system 1206. For instance, in some examples, only the coupon code and datestamp of the time of redemption is reported to the coupon system 1206 for each coupon code. Additionally, the basket amount may be reported to the coupon system 1206 by the retailer 1202. The retailer may have an internal data warehouse (not shown) to which they transfer some or all of the redemption information 1310 regarding each coupon code for more permanent storage in order to free up memory in the point of sale database.

In the disclosed embodiment, the coupon system 1206 and the e-mail engine 1208 are implemented by an ESP system 16. The system 16 may include a coupon reporting database 1320 wherein the redemption information 1310 received from the retailer 1202 is stored for merging with information generated by the e-mail engine 1208. The ESP 16 utilizing the tracking table 1218 generated by the coupon system 1206 at the time of coupon assignment, the e-mail engine 1208 can look up the e-mail address to which each unique coupon code was assigned in a lookup e-mail address step 1330. The email engine can then generate a reporting tracking table 1340 including data extracts that are Application Program interface (API) or File Transfer Protocol (FTP) accessible to the coupon system 1206 for each unique coupon code. As shown, for example, in FIG. 13, the data extracts included in the reporting tracking table 1340 may include the e-mail address of the recipient to whom each unique coupon code was assigned, the JobID for the job that the coupon was served from, the coupon code and a date stamp of when the coupon was assigned.

The reporting tracking table 1340 generated by the e-mail engine 1208 may be merged with the redemptions information 1310 stored in the coupon reporting database 1320 by the coupon system 1206 to generate a coupon redemption report 1350. The coupon redemption report 1350 and any data contained therein, in one embodiment, is available online to the retailer 1202. The data included in the coupon redemption report 1350 may be organized by e-mail campaign, by coupon campaign or by e-mail recipient. Among the type of information which may be present in the coupon redemption report include the redemption rate compared to e-mails delivered or e-mails opened and/or the redemption lag time determined from the datestamp of the unique coupon code assignment contained in the reporting tracking table 1340 and the datestamp for the time of redemption contained in the redemption information 1310.

The system 16 via the coupon system 1206 may provide an administrative interface such as user interface 10 in FIG. 1 generated by the ESP's server that facilitates creation of new coupon campaigns by permitting the retailer 1202 interfacing with the administrative interface, such as via a first remote device, to enter information indicative of the name and description of the new coupon campaign, to enter information establishing an end date at which the coupon is no longer to be served, an upload tool for uploading coupon images and alternative images specific to the campaign and an import tool for new coupon codes associated with the campaign.

The administrative interface may also be utilized to display or otherwise report to the retailer 1202 tracking information regarding any ongoing coupon campaigns. Among the information that may be presented by the interface is real time information regarding coupon availability, including the number of total unique coupon codes uploaded, the number of unique coupon codes assigned to a consumer, the number of remaining unassigned unique coupon codes, the percentage of available unique coupon codes assigned, the time at which the first unique coupon code was assigned, the time elapsed since the assignment of the first unique coupon code, the average rate per time period (per minute, per hour, per day, per week) that unique coupon codes have been assigned, the peak distribution rate per time period, and/or other information that can be calculated or otherwise gleaned from the information stored in the tracking table 1218 or information stored in memory or on any database accessible by the ESP, including but not limited to the coupon reporting database 1320, ad store 32, and/or the database 918. Utilizing the administrative interface the retailer 1202 may be provided access to raw data extracts utilized to generate the coupon redemption report 1350.

In other embodiments of the disclosed system and method, the live content displayed in the live content area 1006 of the e-mail with embedded live content 18 may be an advertisement that includes an image presenting an offer or an opportunity that is available for a limited time (e.g. year end sale from December 26 to December 31), is available only on certain days of the week (e.g. kids under 12 eat free from children's menu on Tuesdays with purchase of adult meal) or the year (e.g. complimentary birthday meals) etc. The image presenting the offer or opportunity is stored in memory associated with expiration data and possibly desired attributes that should be exhibited by a recipient. The image, expiration data and desired attributes may be stored in a database or other appropriate memory structure. Accepting the offer or taking advantage of the opportunity may require accessing a webpage or following a link. Java scripts or other code, such as URLs may be stored in memory associated with the live content in such situations.

Figure 7A:
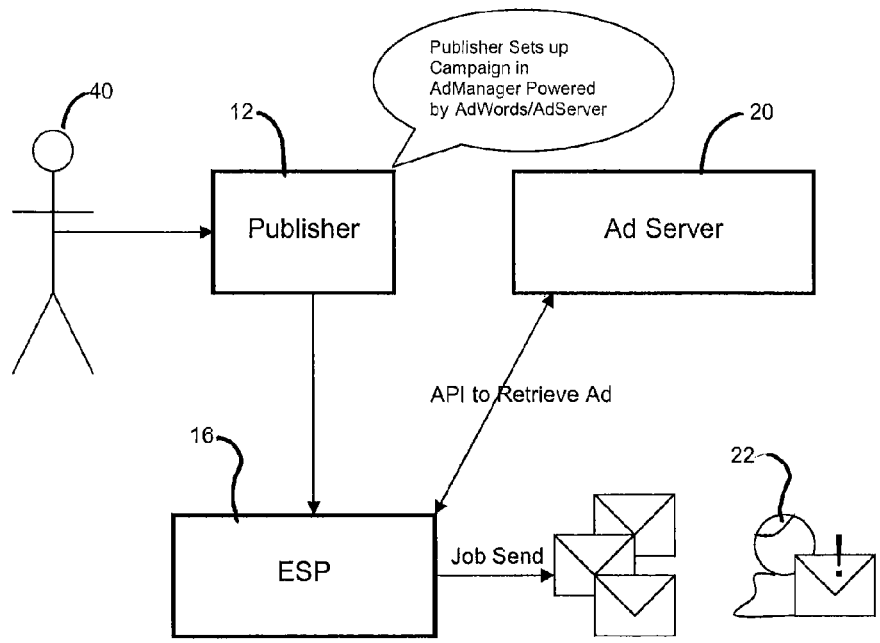
FIG. 7 is a diagrammatic view of two embodiments of a system and method of providing e-mails.

As shown for example, in FIG. 7, in one embodiment of the disclosed system and method the e-mail creator 12, referred to in this embodiment as the publisher 12, may be a person who has indicated their willingness to allow advertising to be embedded in e-mails sent on his or her behalf by an ESP using system 16 who has indicated that advertisements may be embedded in the e-mail by including appropriate live content code to designate a live content area 1006 in the e-mail document with embedded live content 18. In such an embodiment, the e-mail creator 12 may be endeavoring to fund or monetize an e-mail subscription service wherein they are providing e-mails containing relevant content to subscriber recipients who have opted into the subscription service. Such an e-mail subscription service could be funded or monetized by the e-mail creator 12 receiving all or a portion of the advertising revenue generated from placement of advertising materials in e-mails sent to subscribers or from receiving a credit for all or a portion of the advertisement revenue generated against costs charged by an ESP sending the e-mails sent to subscribers.

In one embodiment of the disclosed system and method, the e-mail document may be created utilizing hypertext mark up language ("HTML") or another appropriate language for generating e-mail documents. In an alternative embodiment of the disclosed system and method the e-mail document may be created utilizing a graphical user interface ("GUI"), examples of which are illustrated in FIGS. 2-6, providing appropriate tools for entering generic content such as text and images and for identifying one or more areas of the e-mail document that will receive dynamic content, at least one of such areas being configured for receiving live content. The GUI is configured to generate and appropriately embedded HTML statement in the e-mail document. The GUI will generate appropriate code for inclusion in the e-mail document to properly render an e-mail at the time of opening which e-mail will include live content.

As shown, for example, in FIG. 1, an e-mail sender 14 indicates that an e-mail should be sent in a send e-mail step. The send message step may include an indication of the recipients 22 who should receive an e-mail message and the e-mail document with embedded live content 18 that should be sent. The e-mail message sender 14 may be the e-mail creator 12, a third party or some automated system that requests that e-mails be sent according to its programming. An outbound message manager 24 accesses the appropriate e-mail document with live content 18 referenced in the e-mail send request, interprets code or other statements in or associated with the referenced e-mail document to determine the attributes used to select the appropriate dynamic content to be included in the dynamic content areas 1004, 1006 of the e-mail document, including any attributes to be used to determine the appropriate live content to be included in the live content area 1006, accesses memory locations wherein data is stored to determine what attributes are exhibited by each recipient and constructs at least portions of the e-mail message to be sent to each recipient.

In one embodiment, for all dynamic content areas 1004 of the e-mail document that does not include live content, the appropriate dynamic content for each recipient 22 is embedded and rendered in the e-mail message to be sent to each recipient by accessing the appropriate memory location to retrieve the appropriate dynamic content. In this specific embodiment, the outbound message manager 24 also determines what live content would be currently appropriate for including in the e-mail message to be sent to each indicated recipient 22. Upon determining the currently appropriate live content for each recipient, the outbound message manager 24 accesses the memory location (often on memory available to the ad server 20) where the currently appropriate live content is stored, and downloads the image, attribute and expiration data and any java script or other code that controls interactions with the live content for the currently appropriate live content for each e-mail recipient 22. The outbound message manager 24 stores the downloaded data in a memory location, such as for example in the link store memory 26, accessible by the click manager 28 and associates it with some identifier for the appropriate e-mail message. Once the outbound message manager 24 has assembled each e-mail message to be sent by embedding the appropriate non-live content dynamic content in the dynamic content area 1004 of the e-mail message with embedded live content 18 and leaving the appropriate code from the e-mail document 18 for the live content selection (which appears to be a link to a browser) in the e-mail message without including an image, each e-mail message so constructed is sent to an e-mail transfer agent 30 for delivery to the appropriate recipient 22. The outbound message manager 24 ensures that the 'Track all links found within this e-mail' feature is enabled when the e-mail is sent so that appropriate data can be acquired for billing and reporting to advertisers.

The e-mail messages sent to each recipient 22 do not include any java script or other code required for live content which may render the e-mail message undeliverable. Delivery of each e-mail message is tracked in a conventional manner. Tracking links for each e-mail message sent are stored in link store 26.

In making the determination of which dynamic content should be included in the dynamic content areas 1004, it is possible that no available dynamic content will satisfy the criteria set forth in the e-mail document for selecting dynamic content. Default content that is not time sensitive may be provided for inclusion in dynamic content areas 1004 if no other content meets all of the criteria set forth in the e-mail document 18. Appropriate if-then-else logic may be applied by the outbound message manager 24 to determine whether dynamic content or default content will be included in each dynamic content area 1004 of the e-mail document. Alternatively, if no appropriate content is found for inclusion in one or more dynamic content areas 1004 in the e-mail document, at the time the outbound e-mail manager 24 assembles an e-mail for delivery, the code in dynamic content area 1004 may be left in the e-mail or may be modified if necessary to send an HTTP call to the click manager 28 at the time the e-mail is opened requesting that any then appropriate available dynamic content be rendered in the dynamic content area 1004. The click manager 28 may then apply the appropriate if-then-else logic to deliver then available appropriate dynamic content or default content if no appropriate dynamic content is available for rendering in the dynamic content area 1004. Alternatively, if no appropriate dynamic content is available either at assembly or at open, the dynamic content area 1004 for which no appropriate content is available may be left blank when the e-mail message is rendered.

Those skilled in the art will recognize that since the e-mail message viewed by the recipient is not fully rendered until opened, it is within the scope of the disclosure for the non-live dynamic content area 1004 and the appropriate live dynamic content area 1006 to be treated in the same manner as the live content area 1006 and live content is treated by the outbound message manager 24.

Each recipient 22 accesses their e-mail via a computing device running an e-mail client, such as, for example, a second remote device 919. The e-mail client may be a thick client with an HTML agent, such as Outlook® from MicroSoft®, or a web based e-mail client such as Yahoo Mail®. When the recipient 22 opens the e-mail message, the embedded live content code is perceived to be a link to a browser and thus an HTTP call indicative that the e-mail has been opened is sent to the click manager 28. In one embodiment, the open e-mail( ) HTTP Get-style ad request call sent to the click manager 28 includes API calls wrapped in a URL. In one embodiment the entire ad URL is embedded inside the live content area 1006 of the e-mail document with embedded live content 18. The output type for the live content is HTML. In one embodiment the live content or ad to be displayed in the live content area 1006 is 'display ad'-type ad (<a href= . . . ><img src= . . . ></a>). The live content Ad URL returns a single display ad (multiple ads require multiple ad_insert blocks).

In one embodiment, one wrapped API induces the ESP system 16 to check the previously stored live content satisfying the ad request from the opened e-mail to determine if it is still timely by checking its associated expiration data. If the previously stored live content is still timely, the ESP system 16 delivers the image for the live content and any java or control codes to the recipient and the e-mail message is rendered. If the previously stored live content is no longer timely, the click manager 28 requests new timely live content from the ad server 20 which satisfies the parameters of the ad request in an HTTP request that may include an API to the ad server 20. The ESP system 16 stores the image, expiration data, attribute data and any java script or ad control code of appropriate live content return from the ad server 20 in memory, such as for example in ad store 32. The ad image is returned in response to a get ad image( ) call generated by the opening of the e-mail document with embedded live content 18 by the recipient 22. If the advertisement returned from the ad server 20 includes an ad redirect page, it is returned in response to a get ad page ( ) call.

The click manager causes the ad redirect page to be stored in ad store memory 32. In one embodiment, the redirect page is stored via a store add redirection page ( ) call. In one embodiment, the click manager 28 delivers the image for the appropriate live content to the recipient via a serve ad image( ) call. Upon receipt of the ad image, the e-mail message is finally rendered with the appropriate general, dynamic and live content. Thus e-mail messages including live content are first rendered following opening.

The click manager 28 continues to monitor recipient 22 interactions with the e-mail. If the image delivered for display in the live content area is clicked, the e-mail client sends an HTTP click ad link( ) call to the click manager 28. In response to receipt of the click ad link( ) call the click manager 28 retrieves the redirection page from ad store memory 32 utilizing a Get ad redirection page( ) call and stores data indicating that the ad was clicked upon for billing and reporting purposes. The click manager 28 sends the appropriate redirection page to the second remote device accessed by the recipient 22 via an HTTP serve ad redirection page( ) call.

In one embodiment, each time the e-mail message is re-opened by the recipient, the system delivers appropriate live content for rendering in the live content area in the manner described above. The reference to an image is not to a fixed location, but rather triggers live content's server side processing that determines, in real time, the image to be displayed based on parameters such as time, number of impressions already delivered for an image and/or other appropriate parameters.

In one embodiment of the disclosed system and method HTML is utilized to create the e-mail document with live content 18. However, since many targeted advertising servers or ESPs using, for example system 16, as illustratively shown in FIG. 7, deliver e-mails for clients or e-mail creators 12 that do not desire live content but do wish to have advertisements sold to an advertiser 40 displayed in their e-mails, as shown for example, in FIG. 7A, and for clients 12 who do desire that live content from advertisers 40 be included in their e-mails, as shown, for example, in FIGS. 7B and 8, a business rule (here used in the sense of a switch or flag indicating to the system that live content may be included in an e-mail) may be turned on or set with regard to clients requesting the ability to designate live content areas 1006 in their e-mail documents. In one example a system operator for the ESP system 16 may enable business rule EMBEDDED_AD_SUPPORT on the account associated with a client that is to be allowed to use this functionality.

FIGS. 2-6 are screen shots of a various screens of GUIs generated by the targeted advertising server to facilitate creation of e-mail documents with live content areas.

Figure 2:
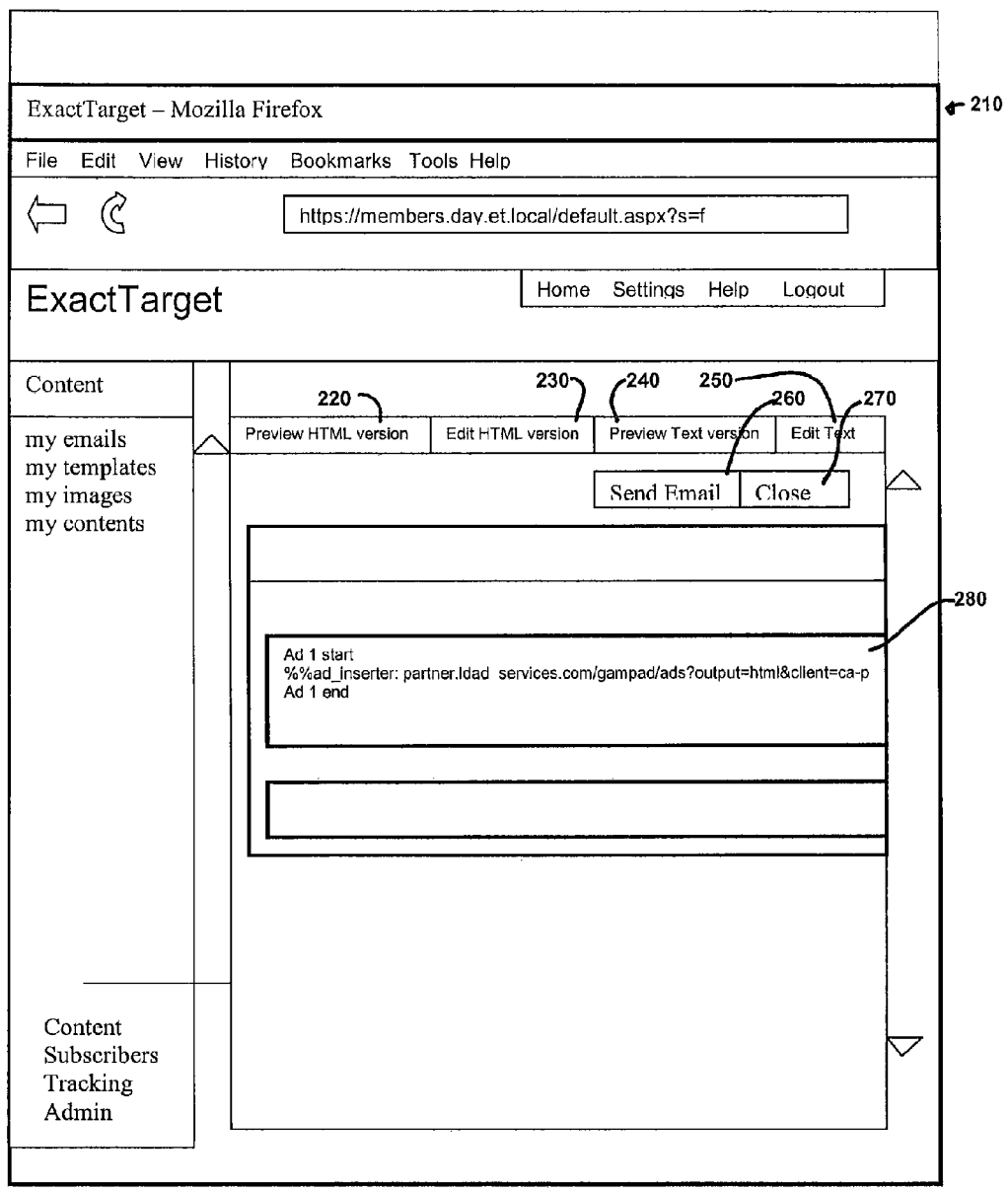
FIG. 2 is a screen shot of a graphical user interface ("GUI") presented by a targeted advertising server for creating e-mail documents with a live content area utilizing HTML.

As shown, for example, in FIG. 2, the targeted advertising server may generate a GUI 210 that facilitates creating an e-mail document having a live content area 1006 through entry of HTML code in appropriate areas. The GUI 210 may include a Preview HTML tab 220, an edit HTML tab 230, a Preview Text Version tab 240, an Edit Text Version tab 250, a send e-mail button 260 and a close button 270. When the edit HTML tab 230 is selected as shown in FIG. 2, the various content areas of the e-mail to be created are displayed and text or appropriate HTML code can be entered into text boxes within the screen. In FIG. 2 the only content area containing text is a live content area 280. Other areas of the e-mail document have yet to be identified as general or generic content areas, dynamic content areas or live content areas 280. In the live content area 280 the appropriate HTML code is entered to set the attributes and instructions for selecting appropriate live content to be displayed in the live content area 1006 when the e-mail is rendered at the time it is opened.

The e-mail creator 12 accessing the GUI 210, after designating a live content area 280 may manually type or copy a URL to the live content (referred to as an ad URL) to be embedded in the live content area 1006 of the sent and opened e-mail. In one embodiment the entire ad URL must be embedded inside the live content area 280 and must call an HTML Ad output type to allow rendering the appropriate live content in the live content area 1006 of the e-mail 18 when it is opened.

Publisher ID and other parameters are entered manually in one embodiment. Utilizing the GUI 210, the e-mail creator 12 creates the e-mail that will have the embedded live content by designating areas for general content, dynamic content and live content 280. In one embodiment, the e-mail creator 12 inserts the tag 'ad_insert' into the content area(s) 280 where the live content ad should display when creating the e-mail document utilizing the GUI 210. The ad_insert tag should include text that provides the details of the publisher and slot (and the URL).

In one embodiment of the GUI 210, the ad_insert tag utilizes the context %%ad_insert:<ad>%%. An appropriate ad_insert tag should be inserted wherever a live content ad should appear. The e-mail creator 12 should replace <ad> with URL-encoded address (including query string parameters) of the ad server 20 from which the live content should be retrieved. The tag 'ad_insert' should only be placed into live content area(s) 280 of the e-mail document with live content 18 and should provide the details of the publisher and slot (and the URL). In the illustrated GUI, Publisher ID and other parameters may be entered manually. Users can use standard syntax to perform subscriber-level substitutions in embedded ad strings for cust_params query parameter or for geo-targeting parameters (gr, gl). Additionally, users can use a system substitution string %%ip_addr%% for ip-based geo-targeting. By utilizing a correlator query parameter improved ad rotation may be implemented through system management. The user should, if desired provide any required substitution strings for cust_params or geo-targeting. Prior to pressing the send button, tracking should be on for the send.

Below are examples of ad_insert tags exhibiting different functionality:

Example 1

No Substitution Strings

%%ad_insert:client=ca-pub-
0123902782641168&slotname=email_300x250
&page_slots=email_
300x250&url=http%3A%2F%2Fwww.exacttarget.
com %2F:%%

Example 2

Substitution Strings

%%ad_insert:client=ca-pub-
0123902782641168&slotname=email_300x250
&page_slots=email_
300x250&url=http%3A%2F%2Fwww.exacttarget.
com %2F
&gr=%%Region%%:%%

```
%%ad_insert:client=ca-pub-
    0123902782641168&slotname=email_300x250
    &page_slots=email_
        300x250&url=http%3A%2F%2Fwww.exacttarget.
        com %2F
    &cust_params=gender%3D%%=LOWERCASE(Gen-
        der)=%%:%%
```

Example 3

IP-Based Geo-Targeting

```
%%                    ad_insert:client=ca-pub-
    0123902782641168&slotname=email_300x250
    &page_slots=email_
        300x250&ip=%%ip_addr%%&url=
        http%3A%2F%2F www.exacttarget.com%2F:%%
```

Figure 3:
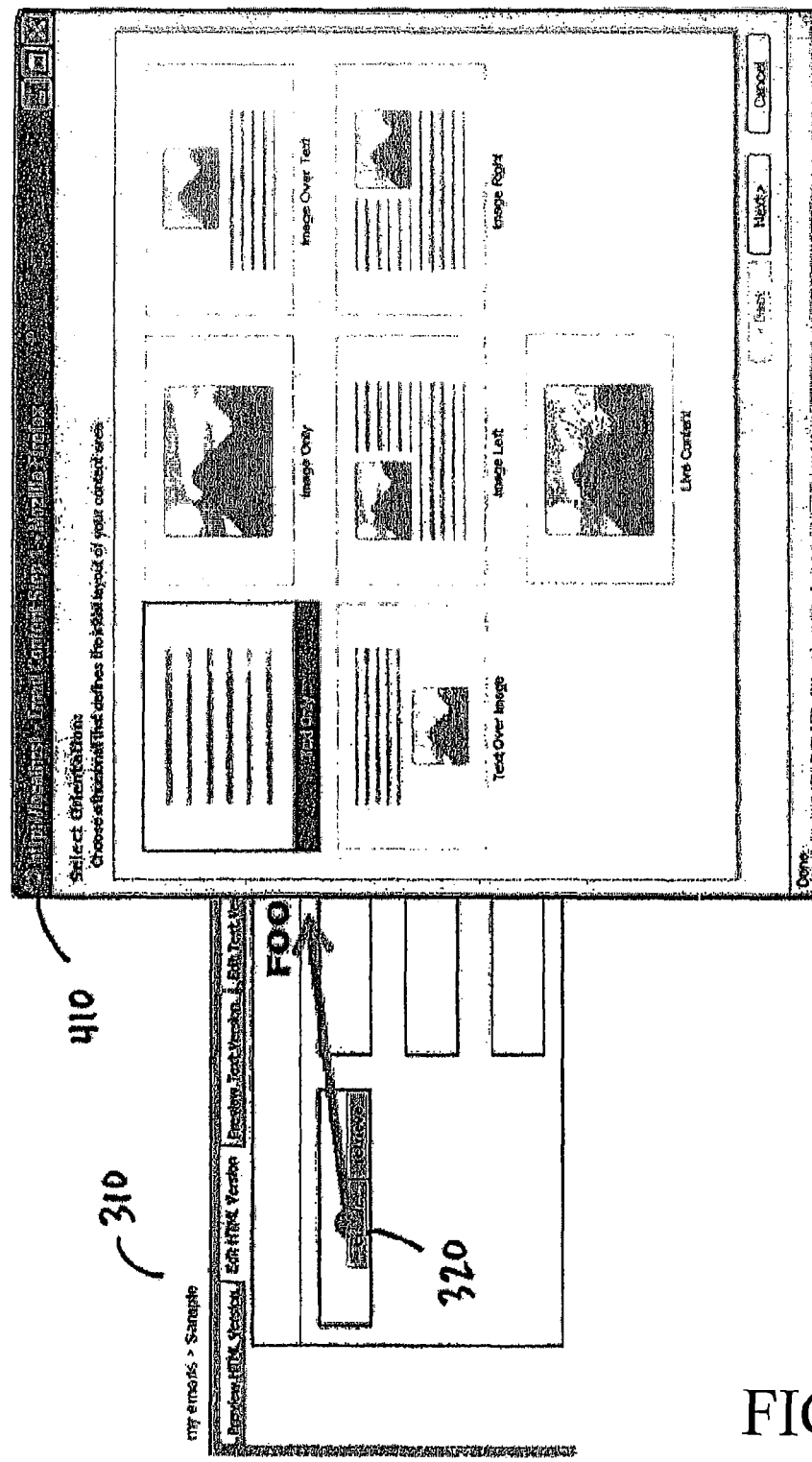
FIG. 3 is a screen shot of a graphical user interface ("GUI") presented by a targeted advertising server for creating e-mail documents with a live content area.
Figure 4:
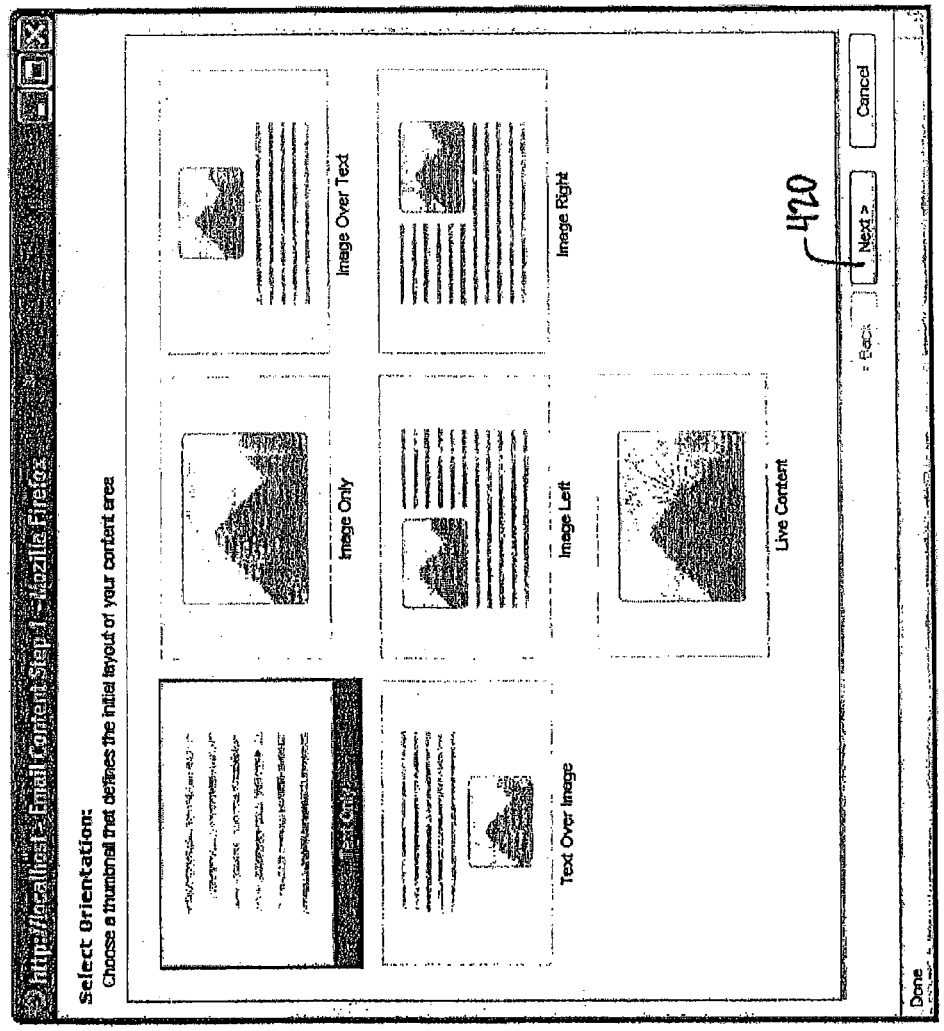
FIG. 4 is a screen shot of a graphical user interface ("GUI") presented by a targeted advertising server for creating e-mail documents with a live content area.
Figure 5:
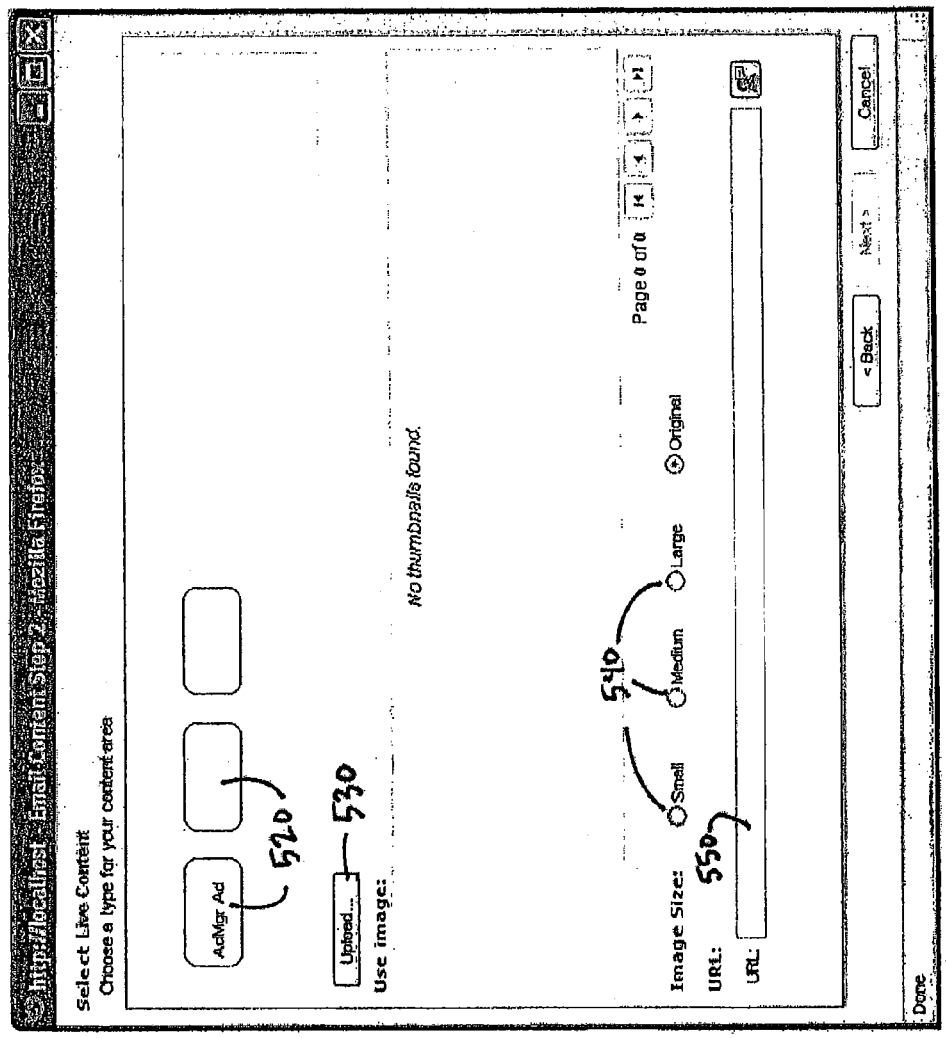
FIG. 5 is a screen shot of a graphical user interface ("GUI") presented by a targeted advertising server for creating e-mail documents with a live content area.
Figure 6:
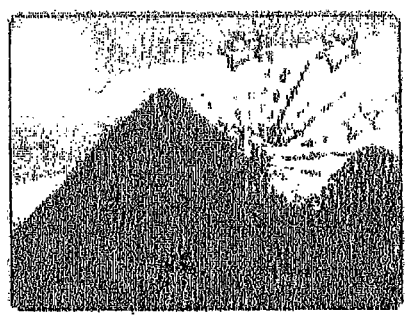
FIG. 6 is a screen shot of a graphical user interface ("GUI") presented by a targeted advertising server for creating e-mail documents with a live content area.
Figure 6:
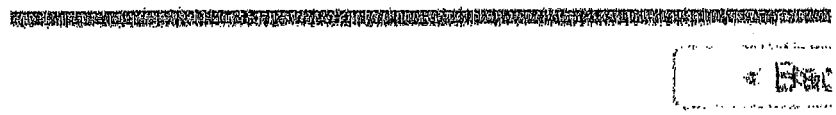

FIGS. 3-6 illustrate screens of a GUI generated by the ESP system 16 to facilitate creation of an e-mail document with live content 18. FIG. 3 shows a top level screen 310 and a select orientation screen 410. The top level screen 310 includes a create button 320 which when clicked causes the GUI to generate the select orientation screen 410, shown in greater detail in FIG. 4. The orientation screen 410 displays several thumbnail images that may be selected by clicking thereon which define the initial layout of the content area of the e-mail document 18. Once an initial layout thumbnail is selected, the next button 420 may be selected to generate a similar screen from which another thumbnail may be selected for an overlay layout that is displayed on the initial layout. Layouts may be sized by click and drag operations. FIG. 6 shows an e-mail document generated by clicking on the initial layout thumbnail designated image left, clicking on the next button 420 and then clicking on the live content thumbnail and sizing the live content layout.

FIG. 5 is a screen shot of a select live content screen 510 that is generated by the ESP system 16 when a live content area 280 is selected for the e-mail document. The screen 510 includes ad server buttons 520 whereby the appropriate ad server 20 may be selected to designate from where the live content should be retrieve. An upload button 530 is provided for uploading images for utilization as live content images not available on an ad server. Image size buttons 540 are provided for selecting the desired relative size of the image to be presented in the live content area 1006 of the e-mail document with embedded live content 18. A URL text box 550 is provided for manual entry of a URL for controlling the live content to be displayed in the live content area. Utilizing the GUI shown in FIGS. 3-6, users can select from a drop-down list in an editor to insert preconfigured portions of ad_insert tags related to specific advertisements into the live content area. The illustrated GUI allows configuration of account-level attributes such as Publisher id and Ad-server URL. The illustrated GUI allows mapping of subscriber attributes to ad-slot custom and native attributes.

One embodiment of the disclosed system and method provides a content integration framework that allows content to be supplied using dynamic images within e-mail messages. The ESP system 16 obtains the appropriate advertisement server-side and embeds the image within the e-mail message when opened. Embedded dynamic image rendering of advertisement allows: 1) Accurate measurement of opens (impressions) and click-throughs; 2) avoiding wasting ad dollars in e-mails that are not opened; 3) avoiding blocking of live content advertisements by ISP because no JavaScript is included in the delivered e-mail message; 4) delivery of time based relevant advertising—E-mails opened today may serve different advertisements than e-mails opened next week; and 5) advertising targeting based not just on content of e-mail but also recipient attributes.

In one embodiment of the disclosed system and method, at the time an e-mail with embedded live content 18 is opened, the image to be presented in the live content area 1006 is requested from the ad server 20. The e-mail content is read by the ad server 20. A targeted advertisement is generated by ad server 20. The advertisement is rendered in an image and served to the e-mail recipient. The advertisement is listed as a page view within a tracking database. If clicked, the click-through is passed through the tracking database. The click-through registers the targeting advertising server as a source and the advertisers' accounts are appropriately updated.

A general enterprise marketing embodiment of the disclosed system and method allows business to monetize their advertising with highly relevant live content ads. A publishing industry embodiment of the disclosed system and method allows publishers to manage all of their ads in one place and enable ad servers to capitalize on the publishers unsold e-mail inventory. An SMB Market embodiment of the disclosed system and method allows' ad servers or other advertisers to offer a free newsletter service in return for serving up highly relevant live ads in those e-mails.

Figure 7B:
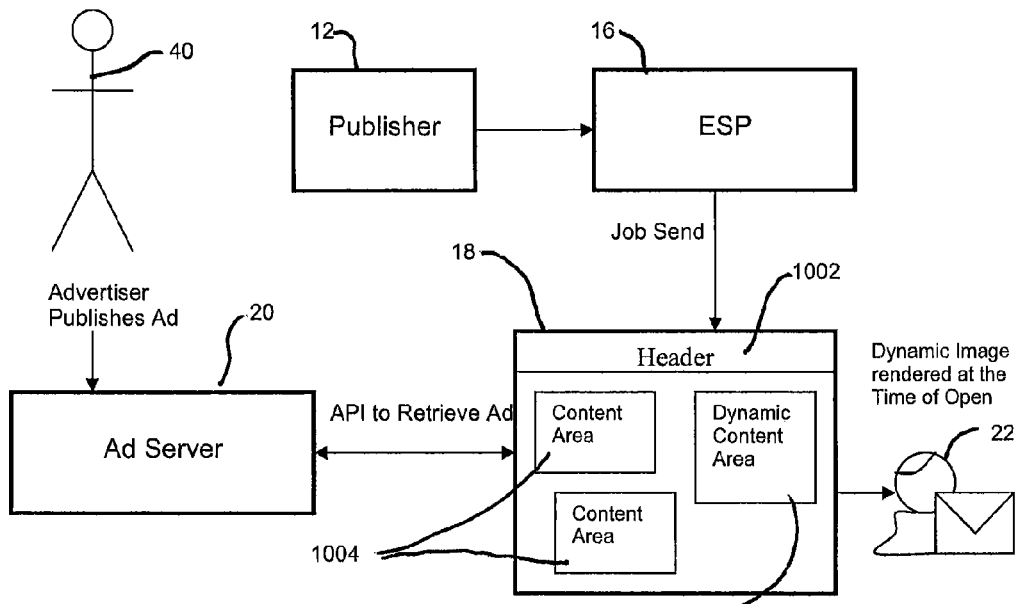
Figure 8:
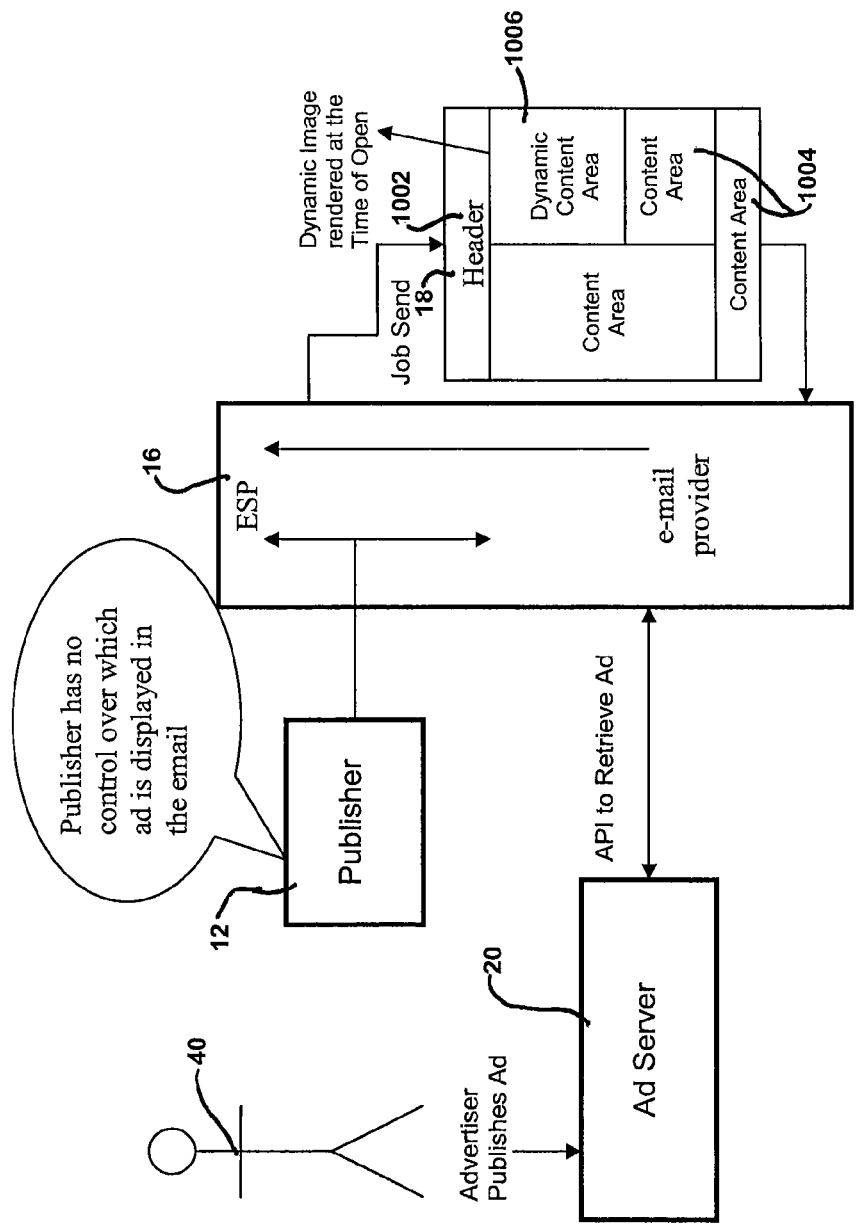
FIG. 8 is a diagrammatic view of one embodiment of a system and method of providing e-mails with live content in which the publisher has no control over which live content is displayed in the e-mail.
Figure 14:
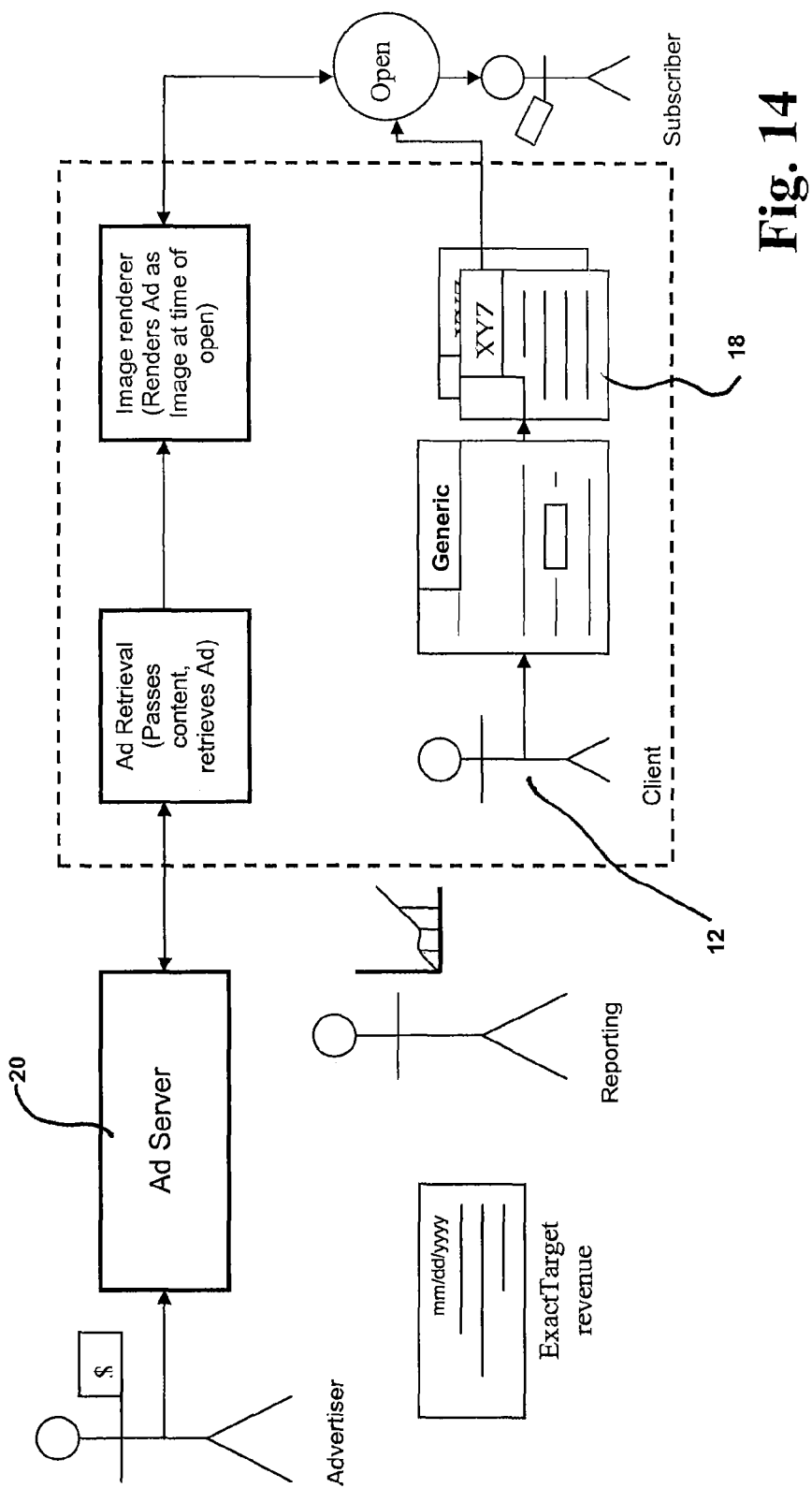
FIG. 14 is a diagram of an embodiment of the disclosed system and method wherein a client of the ESP designates that live content advertisement should be included in e-mail messages sent to recipients but allows advertisers to load the advertisements to be presented as live content in an adserver that is accessed to retrieve the live content at the time the e-mail message is opened.

There are several opportunities to leverage live content ads in e-mail for targeted marketing servers, shown, for example, in FIGS. 7B, 8 and 14.

ESP targeted marketing servers may integrate with Ad Servers allowing existing customers to leverage ad content managed by third party ad servers, as shown, for example, in FIGS. 7B and 8. The customers who sell ads directly on their website, could now sell and manage ads in e-mails in a similar fashion to their web page inventory. Examples of ad servers 20 are 24/7 Real Media®, and DoubleClick®'s Dart for Publishers®.

ESP system 16 may integrate with third party ad networks allowing Customers to place third party ads within their e-mails, as shown, for example, in FIG. 14. Customers who do have the staff to sell ad space in their e-mails can monetize their e-mail program by placing ads managed and hosted by third party ad networks. Examples of third party ad networks are Google® AdSense®, Microsoft® AdCenter®, Yahoo® Advertising, Ad Knowledge®, and many more.

The targeted marketing server may create an advertising exchange where the targeting market server becomes an ad network that connects advertisers with e-mail marketers. This makes the ad inventory purchased by advertisers available to customers to place in their e-mails in an ad exchange.

The targeting marketing server may go to market directly or through a partner to offer a free newsletter service in return for serving up highly relevant and local ads in those e-mails.

According to one embodiment of the disclosed system and method, as shown, for example, in FIG. 14, a third-party ad server 20 supplies live content for display within a live content area 1006 of an e-mail message originally sent by a ESP system 16 to a recipient. The ESP system 16, in at least one embodiment, utilizes demographic or other information regarding the recipient who has just opened an e-mail to select appropriate live content for display in the live dynamic content area 1006 of the e-mail document with embedded live content. The appropriate live content is obtained server-side by the ESP system 16 at the time the e-mail message is opened by the recipient. The ESP system 16 utilizes embedded dynamic image rendering of the live content. Utilizing embedded dynamic rendering of the live content facilitates accurate measurement of the number of impressions (i.e. e-mail openings) and interactions (click throughs) of the live content. This provides a more accurate measurement of revenue generating events for the pricing scheme utilized for selling the advertising (e.g. CPM impressions or CPC). As a result, advertising dollars are not wasted on e-mails that are not opened. Since the embedded dynamic image rendering does not utilize JavaScript imbedded in the e-mail message, which is often blocked by e-mail filters, to deliver the live content the e-mail messages that will present the live content is less likely to be blocked by an interne service provider ("ISP"). Utilizing embedded dynamic image rendering to deliver the live content, allows the live content rendered in the e-mail at the time of opening to be time relevant live content. As mentioned above, the appropriate live content may also be selected not only on a time sensitive basis but also based on the content of the e-mail message and/or other demographic information or attributes of the recipient.

In one embodiment of the disclosed system and method, an e-mail creator or client 12 creates an e-mail document with embedded live content 18 by designating a live content area 1006 wherein they are willing to have live content from a third party ad server 20 displayed. An ESP system 16 sends multiple e-mail documents with embedded live content 18 to a plurality of recipients or subscribers 22 by sending the e-mail message to a remote device accessed by the subscriber 22. When the recipient 22 interacts with the remote device to indicate a desire to open such e-mail message 18, the remote device executing code embedded in the e-mail document 18 requests an image from the web server for display in the live content area 1006 configured to display live content.

Although the invention has been described in detail with reference to certain preferred embodiments and specific examples, variations and modifications exist within the scope and spirit of the invention as described and as defined in the following claims.

What is claimed is:

1. A computerized method for generating and send e-mail messages containing live content, the method comprising:
   sending a plurality of email messages to a plurality of recipients, each e-mail message of the plurality of e-mail messages comprising a live content area and a unique identifier identifying one recipient of the plurality of recipients:
   receiving a request from a mail client to serve the live content area over a computer network, the request further comprising the unique identifier;
   retrieving an image data from a memory based at least in part on a demographic information associated with the recipient and an expiration data, the image data corresponding to a marketing advertisement and the expiration data corresponding to an expiration date of the marketing advertisement that is indicative of a number of times the image data is to be retrieved; and
   transmitting the image data to the mail client over the computer network, wherein a default image data is retrieved and transmitted in the event that the request is received after the image data has been retrieved more than the number of times.

2. The method of claim 1, wherein the image data is associated with a unique coupon for the recipient.

3. The method of claim 1, wherein the demographic information is a geographic location and the image data is retrieved based at least in part on a geo-targeted competitive couponing model based on the geographic location.

4. The method of claim 1, wherein the plurality of e-mail messages are sent to the plurality of recipients upon receiving an indication that each of the plurality of recipients abandoned one or more online items in a shopping cart.

5. The method of claim 4, wherein the image data is a notification that the recipient abandoned the one or more on line items in the shopping cart.

6. The method of claim 1, wherein the default image data, when rendered in the mail client, displays a standard coupon.

7. The method of claim 1, wherein the image data, when rendered in the mail client displays a coupon uniquely associated with the recipient.

8. The method of claim 1, wherein the request further comprises at least one substitution string, and the image data is retrieved based at least in part on each of the at least one substitution string.

9. A computer system for generating and sending e-mail messages containing live content, the system comprising:
   an e-mail service provider computer system including memory configured to:
   send a plurality of email messages to a plurality of recipients, each e-mail message of the plurality of e-mail messages comprising a live content area and a unique identifier identifying one recipient of the plurality of recipients:
   receive a request from a mail client to serve the live content area over a computer network, the request further comprising the unique identifier;
   retrieve an image data from a memory based at least in part on a demographic information associated with the recipient and an expiration data, the image data corresponding to a marketing advertisement and the expiration data corresponding to an expiration date of the marketing advertisement that is indicative of a number of times the image data is to be retrieved; and
   transmit the image data to the mail client over the computer network, wherein a default image data is retrieved and transmitted in the event that the request is received after the image data has been retrieved more than the number of times.

10. The computer system of claim 9, wherein the image data is associated with a unique coupon for the recipient.

11. The computer system of claim 9, wherein the demographic information is a geographic location and the image data is retrieved based at least in part on a geo-targeted competitive couponing model based on the geographic location.

12. The computer system of claim 9, wherein the email service provider computer system is further configured to send the plurality of e-mail messages to the plurality of recipients upon receiving an indication that each of the plurality of recipients abandoned one or more online items in a shopping cart.

13. The computer system of claim 12, wherein the image data comprises a notification that the recipient abandoned the one or more on line items in the shopping cart.

14. The computer system of claim 9, wherein the default image data, when rendered in the mail client, displays a standard coupon.

15. The computer system of claim 9, wherein the image data, when rendered in the mail client displays a coupon uniquely associated with the recipient.

16. The computer system of claim 9, wherein the request further comprises at least one substitution string, and the image data is retrieved based at least in part on each of the at least one substitution string.

17. A non-transitory computer-readable medium storing a plurality of instructions which, when executed by a processor, cause the processor to:
   send a plurality of email messages to a plurality of recipients, each e-mail message of the plurality of e-mail messages comprising a live content area and a unique identifier identifying one recipient of the plurality of recipients;

receive a request from a mail client to serve the live content area over a computer network, the request further comprising the unique identifier;

retrieve an image data from a memory based at least in part on a demographic information associated with the recipient and an expiration data, the image data corresponding to a marketing advertisement and the expiration data corresponding to an expiration date of the marketing advertisement that is indicative of a number of times the image data is to be retrieved; and transmit the image data to the mail client over the computer network, wherein a default image data is retrieved and transmitted in the event that the request is received after the image data has been retrieved more than the number of times.

18. The medium of claim 17, wherein the image data is associated with a unique coupon for the recipient.

19. The medium of claim 17, wherein the demographic information is a geographic location and the image data is retrieved based at least in part on a geo-targeted competitive couponing model based on the geographic location.

20. The medium of claim 17, wherein the instructions further cause the processor to send the plurality of e-mail messages to the plurality of recipients upon receiving an indication that each of the plurality of recipients abandoned one or more online items in a shopping cart.

21. The medium of claim 20, wherein the image data is a notification that the recipient abandoned the one or more on line items in the shopping cart.

22. The medium of claim 17, wherein the default image data, when rendered in the mail client, displays a standard coupon.

23. The medium of claim 17, wherein the image data, when rendered in the mail client displays a coupon uniquely associated with the recipient.

24. The medium of claim 17, wherein the request further comprises at least one substitution string, and the image data is retrieved based at least in part on each of the at least one substitution string.

* * * * *